(12) United States Patent
Halambi et al.

(10) Patent No.: US 7,926,046 B2
(45) Date of Patent: Apr. 12, 2011

(54) COMPILER METHOD FOR EXTRACTING AND ACCELERATOR TEMPLATE PROGRAM

(76) Inventors: Soorgoli Ashok Halambi, Bangalore (IN); Sarang Ramchandra Shelke, Bangalore (IN); Bhramar Bhushan Vatsa, Bangalore (IN); Dibyapran Sanyal, Noida (IN); Nishant Manohar Nakate, Bangalore (IN); Ramanujan K Valmiki, Bangalore (IN); Sai Pramod Kumar Atmakuru, Hyderabad (IN); William C Salefski, San Jose, CA (US); Vidya Praveen, Bangalore (IN)

( * ) Notice: Subject to any disclaimer, the term of this patent is extended or adjusted under 35 U.S.C. 154(b) by 1229 days.

(21) Appl. No.: 11/482,579

(22) Filed: Jul. 7, 2006

(65) Prior Publication Data

US 2007/0169059 A1    Jul. 19, 2007

(30) Foreign Application Priority Data

Dec. 13, 2005    (IN) ............................ 1820/CHE/2005

(51) Int. Cl.
*G06F 9/44*    (2006.01)
*G06F 9/45*    (2006.01)
(52) U.S. Cl. ........ 717/151; 717/149; 717/150; 717/106; 717/107
(58) Field of Classification Search ........................ None
See application file for complete search history.

(56) References Cited

U.S. PATENT DOCUMENTS

| | | | |
|---|---|---|---|
| 4,398,249 A | 8/1983 | Pardo et al. | |
| 4,807,126 A | 2/1989 | Gotou et al. | |
| 5,481,723 A | 1/1996 | Harris et al. | |
| 5,933,642 A | 8/1999 | Greenbaum et al. | |
| 6,301,706 B1 | 10/2001 | Maslennikov et al. | |
| 7,370,311 B1* | 5/2008 | Pritchard et al. | 716/116 |
| 2004/0019886 A1 | 1/2004 | Berent et al. | |
| 2004/0025150 A1 | 2/2004 | Heishi et al. | |
| 2005/0132344 A1* | 6/2005 | Vorbach et al. | 717/151 |
| 2006/0048122 A1* | 3/2006 | Barton et al. | 717/151 |

(Continued)

FOREIGN PATENT DOCUMENTS

JP    EP 1 398 695 A2    8/2003

(Continued)

OTHER PUBLICATIONS

Becker et al, Parallelization in Co-Compilation for Configurable Accelerator, 1998, IEEE.*

(Continued)

*Primary Examiner* — Jason Mitchell
*Assistant Examiner* — Mark A Gooray
(74) *Attorney, Agent, or Firm* — Ash Tankha; IP Legal Services

(57) ABSTRACT

This invention describes a compilation method of extracting and implementing an accelerator control program from an application source code in a processor based system. The application source code comprises arrays and loops. The input application source code is sequential, with loop, branch and call control structures, while the generated output of this invention has parallel execution semantics. The compilation method comprises the step of performing loop nest analysis, transformations and backend processes. The step of loop nest analysis consists of dependence analysis and pointer analysis. Dependence analysis determines the conflicts between the various references to arrays in the loop, and pointer analysis determines if two pointer references in a loop are in conflict. Transformations convert the loops from their original sequential execution semantics to parallel execution semantics. The back-end process determines the parameters and memory map of the accelerator and the hardware dependent software.

23 Claims, 18 Drawing Sheets

U.S. PATENT DOCUMENTS

2007/0083730 A1* 4/2007 Vorbach et al. .............. 712/10

FOREIGN PATENT DOCUMENTS

US        EP 1 349 092 A2    3/2003

OTHER PUBLICATIONS

Jones et al, "An FPGA-based VLIW Processor with Custom Hardware Execution", Feb. 20005, ACM.*

Kulkarni et al, "Linear Loop Transformations in Optimizing Compilers for Paralle Machines", May 1995, The Australian Computer Journal, pp. 41-50.*

Derriet et al, ("Loop Tiling for Reconfigurable Accelerators"), 2001, Springer-Verlag Verlin Heidelberg.*

Wolf et al, "A Loop Transformation Theory and an Algorithm To Maximize Parallelism", 1991, IEEE.*

Artigas, "Automatic Loop Transformation and Parallelization for Java", 2000, ACM.*

* cited by examiner

```
for (i = 0; i < MAX; i++)
{
    for (j = 0; j < MAX; j++)
    {
        val = C0 * a[i+1][j+1] + C1 * a[i][j+1] + C2*a[i+1][j];
        a[i][j] = a[i][j] - val;
    }
}
```

FIGURE 4

/* SAMPLE SOURCE CODE FOR LOOP FUSION */

```
for (i = 0; i < MAX; i++)
{
      a[i+1] = b[i] + c[i];
}
for (j = 0; j < MAX; j++)
{
      d[i] = a[i]*b[i];
}
```

FIGURE 5A

/* RESULTANT FUSED LOOP IS BELOW*/

```
for (i = 0; i < MAX; i++)
{
      a[i+1] = b[i] + c[i];
      d[i] = a[i] * b[i];
}
```

FIGURE 5B

/*EXAMPLE SOURCE CODE*/

```
for (i = 0; i < MAX; i++)
{
    for (j = 0; j < MAX; j++)
    {
        val = C0 * a[i+1][j+1] + C1 * a[i][j+1] + C2*a[i+1][j];
        a[i][j] = a[i][j] - val;
    }
}
```

FIGURE 6A

```
for (i = 0; i < MAX; i++)
{
    a_0 = a[i+1][0];
    for (j = 0; j < MAX; j++)
    {
        a_1 = a[i+1][j+1]
        val = C0 * a_1 + C1 * a[i][j+1] + C2*a_0;
        a[i][j] = a[i][j] - val;
        a_0 = a_1;
    }
}
```

FIGURE 6B

/*EXAMPLE SOURCE CODE*/

```
for (i = 0; i < MAX; i++)
{
      for (j = 0; j < MAX; j++)
      {
            val = C0 * a[i+1][j+1] + C1 * a[i][j+1] + C2*a[i+1][j];
            a[i][j] = a[i][j] - val;
      }
}
```

FIGURE 7A

/*SOURCE CODE AFTER LOOP TILING*/

```
for (i = 0; i < MAX; i++)
{
      for (j_tile = 0; j_tile < MAX; j_tile += 32)
      {
            for (j = j_tile; j < j_tile + 32; j++)
            {
                  val = C0 * a[i+1][j+1] + C1 * a[i][j+1]
                        + C2*a[i+1][j];
                  a[i][j] = a[i][j] - val;
            }
      }
}
```

FIGURE 7B

/*SOURCE CODE AFTER INPUT/COMPUTE/OUTPUT LOOP CREATION*/

```
for (i = 0; i < MAX; i++)
{
      for (j_tile = 0; j_tile < MAX; j_tile += 32)
      {
            for (j = j_tile; j < j_tile + 32; j++)
            {
                  local_a[i+1][j+1] = a[i+1][j+1];
                  local_a[i][j+1] = a[i][j+1];
                  local_a[i+1][j] = a[i+1][j];
                  local_a[i][j] = a[i][j];
            }
            for (j = j_tile; j < j_tile + 32; j++)
            {
                  val = C0 * local_a[i+1][j+1] + C1 * local_a[i][j+1]
                        + C2*local_a[i+1][j];
                  local_a[i][j] = local_a[i][j] - val;
            }
            for (j = j_tile; j < j_tile + 32; j++)
            {
                  a[i][j] = local_a[i][j];
            }
      }
}
```

FIGURE 8

/*SOURCE CODE AFTER LOCAL ARRAY RENAMING*/

```
for (i = 0; i < MAX; i++)
{
    for (j_tile = 0; j_tile < MAX; j_tile += 32)
    {
        for (j = j_tile; j < j_tile + 32; j++)
        {
            local_a_1[j+1] = a[i+1][j+1];
            local_a[j+1] = a[i][j+1];
            local_a_1[j] = a[i+1][j];
            local_a[j] = a[i][j];
        }
        for (j = j_tile; j < j_tile + 32; j++)
        {
            val = C0 * local_a_1[j+1] + C1 * local_a[j+1]
                + C2*local_a_1[j];
            rename_local_a[j] = local_a[j] - val;
        }
        for (j = j_tile; j < j_tile + 32; j++)
        {
            a[i][j] = rename_local_a[j];
        }
    }
}
```

FIGURE 9

/*SOURCE CODE AFTER MERGING DMA TRANSFERS*/

```
for (i = 0; i < MAX; i++)
{
      for (j_tile = 0; j_tile < MAX; j_tile += 32)
      {
            for (j = j_tile; j < j_tile + 33; j++)
            {
                  local_a_1[j] = a[i+1][j];
            }
            for (j = j_tile; j < j_tile + 33; j++)
            {
                  local_a[j] = a[i][j];
            }
            for (j = j_tile; j < j_tile + 32; j++)
            {
                  val = C0 * local_a_1[j+1] + C1 * local_a[j+1]
                        + C2*local_a_1[j];
                  rename_local_a[j] = local_a[j] - val;
            }
            for (j = j_tile; j < j_tile + 32; j++)
            {
                  a[i][j] = rename_local_a[j];
            }
      }
}
```

FIGURE 10

DMA Channels:

Number of channels: 3 (2 reads and 1 write)

RAM Banks:

Number of Banks: 3

RAM Bank 1: Size: 33 words

Holds: "local_a_1" array

Number of ports: 2

Port 1: Write (For DMA to write "local_a_1" data)

Port 2: Read (For Compute Core to read "local_a_1" data)

RAM Bank 2: Size: 33 words

Holds: "local_a" array

Number of ports: 2

Port 1: Write (For DMA to write "local_a" data)

Port 2: Read (For Compute Core to read "local_a" data)

RAM Bank 3: Size: 32 words

Holds: rename_local_a array

Number of ports: 2

Port 1: Read (For DMA to read "rename_local_a" data)

Port 2: Read (For Compute Core to write "rename_local_a" data)

Compute Core Ports:

Number of ports: 2

Port 1: Read-Write (To read "local_a_1" and write " rename_local_a" data)

Port 2: Read (To read "local_a" data)

Compute Core – RAM Bank Connectivity:

Compute Core Port 1:

Connected to RAM Bank 1, port 2 (to read "local_a_1" data)

Connected to RAM Bank 3, port 2 (to write "rename_local_a" data)

Compute Core Port 2:

Connected to RAM Bank 2, port 2 (to read "local_a" data)

FIGURE 11

LOOP (num_iterations: MAX/32)

/* Comment: Corresponds to the outerloop */

DO_DMA (channel: 0, source: &(a[i+1][0]), sink: local_a_1, size: 33, element_size: 4 bytes, address_mode: offset)

/* Comment: Corresponds to the statement in first input loop */

WAIT_DMA (channel:0)

DO_DMA (channel: 1, source: &(a[i][0]), sink: local_a, size: 33, element_size: 4 bytes, address_mode: offset)

/* Comment: Corresponds to the statement in second input loop */

WAIT_DMA (channel:1)

DO_COMPUTE (thread_id: 0, mode_id: 0)

/* Comment: Corresponds to the compute loop */

WAIT_COMPUTE(thread_id:0, mode_id: 0)

DO_DMA (channel: 2, source: rename_local_a, sink: &(a[i][0]), size: 32, element_size: 4 bytes, address_mode: offset)

/* Comment: corresponds to the statement in the output loop */

WAIT_DMA (channel: 2)

END_LOOP

SINT (message: "end of accelerator execution")

/* Comment: Send Interrupt. Optional statement to send an interrupt to the processor */

END

/* Comment: A statement to indicate end of the program. */

FIGURE 12

LOOP (num_iterations: MAX)

/* Comment: Corresponds to the outer-nest loop */

LOOP (num_iterations: MAX/32)

/* Comment: Corresponds to the outerloop */

DO_DMA (channel: 0, source: &(a[1][0]), sink: local_a_1, size: 33, element_size: 4 bytes, address_mode: stride)

/* Comment: Corresponds to the statement in first input loop */

/* Note: this dma operates in stride mode */

WAIT_DMA (channel:0)

DO_DMA (channel: 1, source: &(a[0][0]), sink: local_a, size: 33, element_size: 4 bytes, address_mode: stride)

/* Comment: Corresponds to the statement in second input loop */

/* Note: this dma operates in stride mode */

WAIT_DMA (channel:1)

DO_COMPUTE (thread_id: 0, mode_id: 0)

/* Comment: Corresponds to the compute loop */

WAIT_COMPUTE(thread_id:0, mode_id: 0)

DO_DMA (channel: 2, source: rename_local_a, sink: &(a[0][0]), size: 32, element_size: 4 bytes, address_mode: stride)

/* Comment: corresponds to the statement in the output loop */

/* Note: this dma operates in stride mode */

WAIT_DMA (channel: 2)

END_LOOP

END_LOOP

SINT (message: "end of accelerator execution")

/* Comment: Send Interrupt. Optional statement to send an interrupt to the processor */

END

/* Comment: A statement to indicate end of the program. */

FIGURE 13

LOOP (num_iterations: MAX/32)

/* Comment: Corresponds to the outerloop */

DO_DMA (channel: 0, source: &(a[i+1][0]), sink: local_a_1, size: 33, element_size: 4 bytes, address_mode: offset)

/* Corresponds to the statement in first input loop */

DO_DMA (channel: 1, source: &(a[i][0]), sink: local_a, size: 33, element_size: 4 bytes, address_mode: offset)

/* Corresponds to the statement in second input loop */

WAIT_DMA (channel:0, channel:1, channel:2)

/* This is the result of wait propagation. This statement causes the accelerator to wait until channels 0, 1, and 2 become idle */

DO_COMPUTE (thread_id: 0, mode_id: 0)

/* Corresponds to the compute loop */

WAIT_COMPUTE(thread_id:0, mode_id: 0)

DO_DMA (channel: 2, source: rename_local_a, sink: &(a[i][0]), size: 32, element_size: 4 bytes, address_mode: offset)

/* corresponds to the statement in the output loop */
END_LOOP

WAIT_DMA (channel: 2)
/* This wait dma is generated as a result of wait propagation */
SINT (message: "end of accelerator execution")
END

FIGURE 14

/* Comment: Prologue Start */

DO_DMA (channel: 0, source: &(a[i+1][0]), sink: local_a_1, size: 33, element_size: 4 bytes, address_mode: offset)

/* Corresponds to filling up the first buffer for local_a_1 */

DO_DMA (channel: 1, source: &(a[i][0]), sink: local_a, size: 33, element_size: 4 bytes, address_mode: offset)

/* Corresponds to filling up the first buffer for local_a */

WAIT_DMA (channel:0, channel:1, channel:2)

SWITCH_BUFFER (local_a, local_a_1)

/* Please refer to the explanation below */

/* Comment: Prologue End */

LOOP (num_iterations: MAX/32 - 1)

/* The number of iterations has changed because some of the operations are now performed outside the loop */

DO_DMA (channel: 0, source: &(a[i+1][0]), sink: local_a_1, size: 33, element_size: 4 bytes, address_mode: offset)

/* Corresponds to filling up the buffer for the next set of data */

DO_DMA (channel: 1, source: &(a[i][0]), sink: local_a, size: 33, element_size: 4 bytes, address_mode: offset)

/* Corresponds to filling up the buffer for the next set of data */

DO_COMPUTE (thread_id: 0, mode_id: 0)

/* Compute operates on the first buffer, while DMA fills up the other buffer */

WAIT_COMPUTE(thread_id:0, mode_id: 0)

WAIT_DMA (channel:0, channel:1, channel:2)

FIGURE 15A

/* The above two statements guarantee that the accelerator waits until the current DMA and Compute activities are completed */

SWITCH_BUFFER (local_a, local_a_1, rename_local_a)

/* After the activities are done, switch the buffers for all the local arrays. */

DO_DMA (channel: 2, source: rename_local_a, sink: &(a[i][0]), size: 32, element_size: 4 bytes, address_mode: offset)

/* corresponds to emptying the buffer of the computed set of data */

END_LOOP

/* Comment: Epilogue Start */
WAIT_DMA (channel: 2)
SWITCH_BUFFER (rename_local_a)

DO_COMPUTE (thread_id: 0, mode_id: 0)
/* Compute operates on the remaining buffer filled by the previous DMAs */
DO_DMA (channel: 2, source: rename_local_a, sink: &(a[i][0]), size: 32, element_size: 4 bytes, address_mode: offset)
/* corresponds to emptying the final buffer of the computed set of data */

/* Comment: Epilogue End */

WAIT_DMA (channel: 2)
/* This wait dma is generated as a result of wait propagation */

SINT (message: "end of accelerator execution")
END

FIGURE 15B

Store functions:

```
void store_into_acc(unsigned char value, void *address)
{
        *(unsigned char *)address = value;
}
void store_into_acc(unsigned short value, void *address)
{
        *(unsigned short *)address = value;
}
void store_into_acc(unsigned int value, void *address)
{
        *(unsigned int *)address = value;
}
void store_into_acc(float value, void *address)
{
        *(float *)address = value;
}
void store_into_acc(double value, void *address)
{
        *(double *)address = value;
}
```

Load functions:

```
void load_from_acc(unsigned char *value, void *address)
{
        *value = *(unsigned char *)address;
}
void load_from_acc(unsigned short *value, void *address)
{
        *value = *(unsigned short *)address;
}
void load_from_acc(unsigned int *value, void *address)
{
        *value = *(unsigned int *)address;
}
void load_from_acc(float *value, void *address)
{
        *value = *(float *)address;
}
void load_from_acc(double *value, void *address)
{
        *value = *(double *)address;
}
```

FIGURE 16

COMPILER METHOD FOR EXTRACTING AND ACCELERATOR TEMPLATE PROGRAM

FIELD OF THE INVENTION

The present invention relates in general to a compiler method and more particularly to a compiler method for extracting an accelerator template program.

BACKGROUND OF THE INVENTION

The present invention relates to the generation of a control program for a hardware accelerator from an application source code in any processor-based system, using a novel compilation method. This invention describes a method for automatically generating the program of the controller for an accelerator starting from an application source code, i.e., a sequential high-level language description of the application. The compilation method disclosed improves the performance of the accelerator by parallelising the operations of the accelerator.

Processor-based systems using multiple accelerators are designed to perform tasks such as mathematical calculation, signal processing, etc., in a rapid and cost efficient manner. Processor-based systems typically have a large software component that can be easily changed or modified, even after the system has been built. Also, these software components do not need significant hardware resources other than additional memory, as they run on the existing processors. To control software development costs, it is necessary to write the application using high-level languages such as C/C++, Java, etc., because writing in assembly language is prohibitively expensive both in terms of time and money. Applications written in high-level languages also have the advantage of being portable across different processors.

The disadvantage of using software components in processor-based systems includes reduced performance and increased power consumption. Contemporary embedded systems are rapidly increasing in complexity in terms of the functionality provided. Further, due to market demand, such systems are expected to provide superior performance and power efficiency at a lower cost. Moving more functionality to software may not meet the performance and power goals of the system. Hardware accelerators that perform specific computation intensive tasks of the application can be added to the system to provide the required performance boost. Adding such accelerators also reduces the overall power requirement of the system.

Application specific hardware accelerators suffer from the disadvantage of being relatively fixed, i.e., inflexible, and require long design and development cycles. To incorporate flexibility in the processor based system, the hardware accelerators can be built with a limited amount of programmability. This programmability allows the use of the same accelerator to perform different tasks, and also for modification of the functionality after the system has been built. Further, to avoid long design time, an automatic approach that can generate the application specific programmable accelerator and the control program that executes on the accelerator is needed.

The invention applies parallelisation techniques to improve the performance of the accelerator.

By way of example, this invention describes the compilation method using the C software language as the high-level language. However, the compilation method is generic and is applicable to an application written in other high-level languages such as C++, Java, etc.

SUMMARY OF THE INVENTION

This invention describes a compilation method of extracting and implementing an accelerator control program from an application source code in a processor based system. The application source code comprises arrays and loops. The input application source code is sequential, with loop, branch and call control structures, while the generated output of this invention has parallel execution semantics. The compilation method comprises the step of performing loop nest analysis, transformations and backend processes. The step of loop nest analysis consists of dependence analysis and pointer analysis. Dependence analysis determines the conflicts between the various references to arrays in the loop, and pointer analysis determines if two pointer references in a loop are in conflict. Transformations convert the loops from their original sequential execution semantics to parallel execution semantics. The back-end process determines the parameters and memory map of the accelerator and the hardware dependent software.

BRIEF DESCRIPTION OF THE DRAWINGS

FIG. 4 illustrates a sample application source code on which the process of dependency analysis will be conducted.

FIG. 5A illustrates the sample application source code on which the process of loop fusion will be applied.

FIG. 5B illustrates the resultant fused loop after the application of the loop fusion process on the sample application source code illustrated in FIG. 5A.

FIG. 6A illustrates an example of an application source code on which the process of scalar replacement will be applied.

FIG. 6B illustrates the application source code after the application of the scalar replacement process on the example application source code illustrated in FIG. 6A.

FIG. 7A illustrates an example an application source code on which the process of loop tiling will be applied.

FIG. 7B illustrates the resultant example application source code after the process of loop tiling is applied on the example application source code illustrated in FIG. 7A.

FIG. 8 illustrates the resultant example application source code after the process of input-compute-output loop creation is applied on the application source code illustrated in FIG. 7B.

FIG. 9 illustrates the resultant application source code after the application of the local array renaming and merging direct memory access (DMA) processes on the example application source code illustrated in FIG. 8.

FIG. 10 illustrates the resultant application source code after the application of the merging DMA transfer process on the application source code illustrated in FIG. 9.

FIG. 11 illustrates the accelerator parameters as determined by the application of the algorithm that assigns compute core ports and connects them to the previously determined random access memory. (RAM) bank ports, when applied to the application source code described in FIG. 10.

FIG. 12 illustrates the application of the sequential control program generation rules on the application source code illustrated in FIG. 8.

FIG. 13 illustrates the application of the control program generation rules where the outer-nest loop is also selected for hardware acceleration.

FIG. 14 illustrates the control program derived after applying the wait propagation process to the sequential control program generated.

FIGS. 15A and 15B illustrate the control program derived after performing double buffering.

FIG. 16 illustrates the list of store and load functions for the various supported data-types.

DETAILED DESCRIPTION OF THE INVENTION

Figure 1:
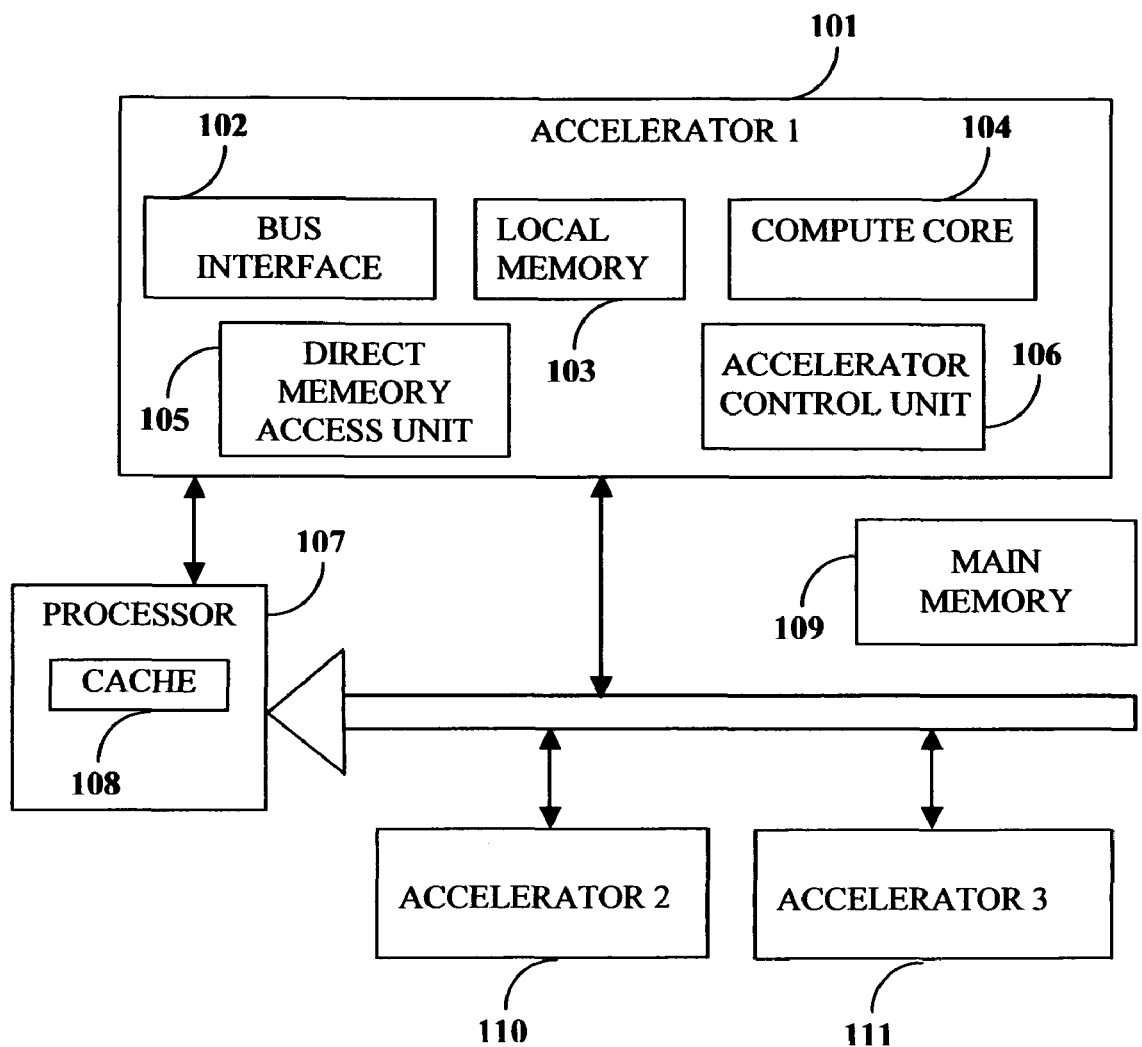
FIG. 1 illustrates the architecture of a processor-based system.

FIG. 1 illustrates the architecture of the processor-based system for extracting an accelerator template program. The architecture of a processor-based system comprises a main memory 109, processor 107, and multiple accelerators such as accelerator 1 101, accelerator 2 110 and accelerator 3 111. Each accelerator consists of a bus interface 102, local memory 103, compute core 104 and direct memory access (DMA) 105 and an accelerator control unit 106. The local memory 103 of the accelerator contains one or more random access memories (RAM). The computational functions of the accelerator are performed by the compute core 104. The system illustrated in FIG. 1 can also include co-processors and peripherals, for example, an universal asynchronous receiver transmitter (UART), display, etc.

This invention describes a compilation method of extracting and implementing an accelerator control program from an application source code in a processor based system consisting of accelerators, one or more processors and one or more main memories. The accelerator control program that resides in the accelerator control unit 106 controls the functions of the accelerator. An accelerator 101 comprises a DMA 105, a compute core 104, a local memory 103 and a programmable accelerator control unit 106. The application source code comprises arrays and loops. The input application source code is sequential, with loop, branch and call control structures, while the generated output of this invention has parallel execution semantics.

The compilation method comprises the step of performing loop nest analysis, transformations 304 and back-end processes 306. The step of loop nest analysis consists of dependence analysis and pointer analysis. Dependence analysis determines the conflicts between the various references to arrays in the loop and pointer analysis determines if two pointer references in a loop are in conflict. Transformations convert the loops from their original sequential execution semantics to parallel execution semantics. The step of conducting transformations comprises the steps of conducting loop tiling and conducting input compute output loop creation. The step of conducting loop tiling is a compiler transformation that divides the iterations of the loop nest into tiles and the size of the tile is chosen based on the amount of local memory available and on the required performance of the accelerator. In the step of conducting input compute output loop creation, the inner-most loop created by the loop tiling process is split into multiple loops and each of the split loop is classified into an input, compute or output activity of the accelerator. In the step of conducting back-end processes 306 for creating an accelerator control program 311 that parallelizes the activities of the components of the accelerator, using the output of the loop-nest analysis and transformation, the parameters, the memory map of the accelerator and hardware dependent software are generated. The parameters of the accelerators include the number of direct memory access channels, size and number of random access memory banks and the connectivity between the ports of the random access memory banks and the compute core 104. The memory map contains each accelerator's address space, the address location of an accelerator's components, and the address of each accelerator's local variable. The hardware dependent software is a software layer that provides interfaces to allow the application software to interact with the accelerator hardware.

The hardware dependent software resides in the main memory 109 along with the application source code. In the final step, the application source code is modified in order to invoke the hardware dependent software. The invocation of the hardware dependent software executes the accelerator control program 311.

The compiler method for extracting an accelerator template program is hereafter referred to as partitioning. Loop nests are a set of hierarchically enclosed loops. The partitioning process includes an analysis of the loop-nests and functions in the application source code and the transformation of the loop-nest and functions into a set of direct memory access (DMA) 105 accesses and compute cores 104. The user selects the loop-nests and functions that are to be transformed into parameters for the accelerator 312 and the accelerator control program 311. The partitioning process then operates on these loop-nests and functions.

This invention describes the compilation method in terms of the analysis and transformations performed on the user selected loop-nests. However, the analysis and transformations mentioned in this invention can also be performed on user selected functions by considering the function as a loop that is called once each time the function is invoked.

The DMA 105 accesses allows for fast transfer of data from the main memory 109 to the accelerator local memory 103 or vice versa. The compute cores 104 operate on the data fetched by the DMA 105 accesses. As the data is stored in the local memory 103, the compute cores 104 can access the data very fast. Also, as the local memory 103 is organized in banks with multiple-ports, the compute cores 104 can access multiple data in parallel further speeding up execution in the accelerator.

The partitioning process generates the accelerator control program. The partitioning process determines the optimal parallelism between the DMA 105 accesses, and between the DMA 105 accesses and compute cores 104 and generates the appropriate synchronization between these various DMA 105 accesses and compute cores 104 to ensure the execution is correct. Finally, the partitioning process creates the instructions that control the communication and synchronization between multiple accelerators and between each accelerator and the processor 107.

In addition to generating the program for the accelerator control unit 106, the partitioning process also determines the optimal parameters of the accelerator components such as number of DMA channels, number and size of local memory banks, etc., based on user input 303 and user supplied area, power and performance constraints 305.

Figure 2:
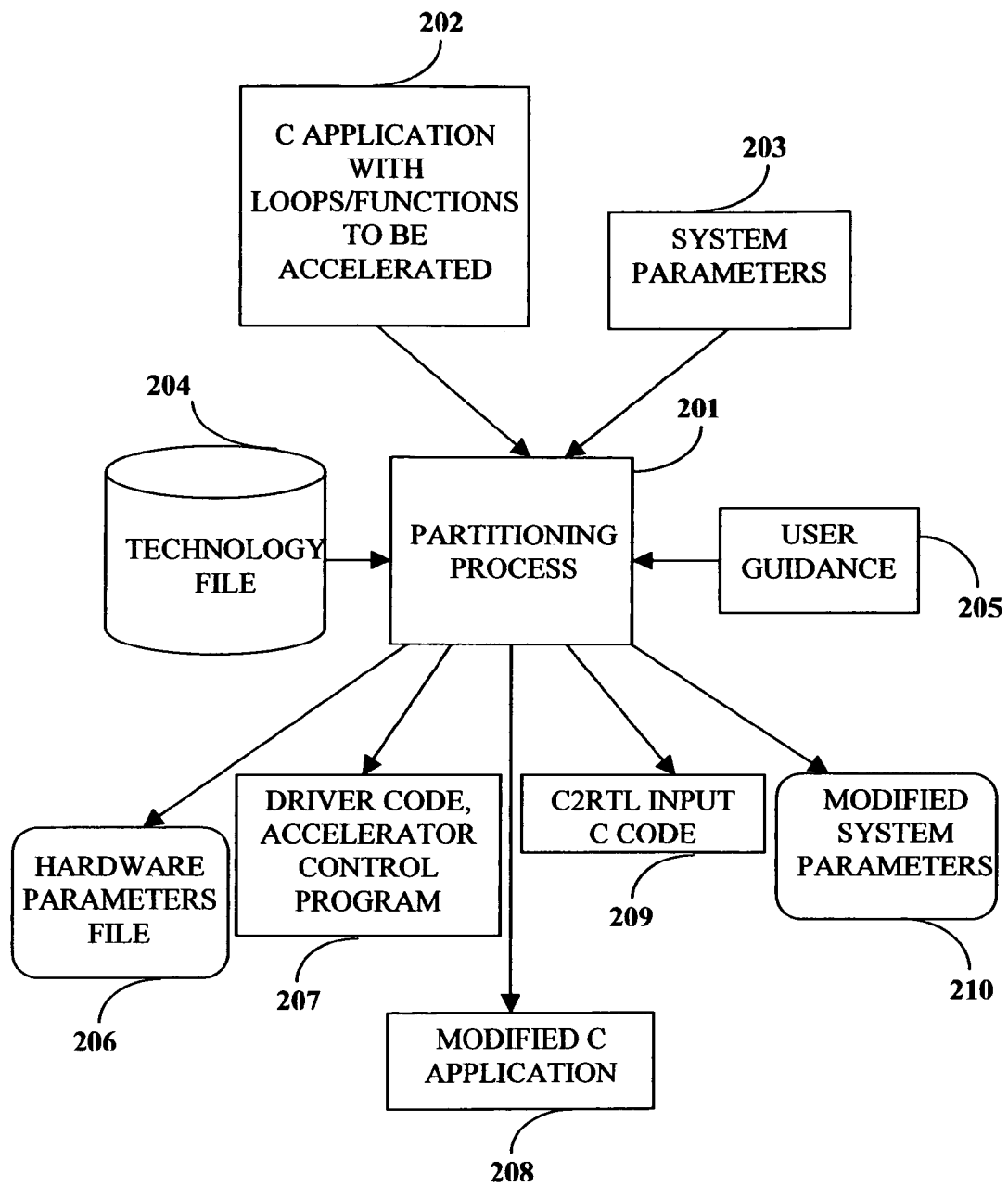
FIG. 2 illustrates the input and output diagram for the partitioning process.

FIG. 2 illustrates the input and output diagram for the partitioning process. The partitioning process 201 requires the following two inputs: the actual application such as the C application 202 with loops or functions that the user needs to accelerate; and, the system parameters 203 of the system in which the accelerator resides. Examples of system parameters include memory map, amount of local memory available, system buses, etc. The technology file 204 is the description of the underlying silicon implementation of the system, such as field programmable gate array (FPGA) or application specific integrated circuit (ASIC) that assists the partitioning process 201 to select different system parameters depending on the technology that the user selects. The partitioning process 201 requires user guidance 205 from the user for certain tasks such as determining the DMA 105 burst size, etc. The user guidance 205 can be an input in the form of an area, memory, power, cost constraints, etc. of either the overall system illustrated in FIG. 1, or specific to one or more of the accelerators illustrated in FIG. 1.

The partitioning process 201 takes the above inputs, determines the DMA 105 and computational statements, and then further parallelises the DMA 105 and computational statements. The hardware parameters file 206 lists the hardware parameters of the accelerator, for example, the number of DMA 105 channels, number of random access memory (RAM) banks, etc. The partitioning process 201 generates an accelerator control program 207 that can be executed instead of the application source code. The partitioning process also generates the device driver that allows the original application source code to communicate with the accelerators. The modified C application 208 is the original application with the driver call inserted and the C to register transfer language (RTL) input code 209 is the part of loop that is transformed using behavioural synthesis. The partitioning process generates the modified system parameters 210 of the system in which the accelerator resides. The modification involves changing the memory map and other system parameters.

Figure 3:
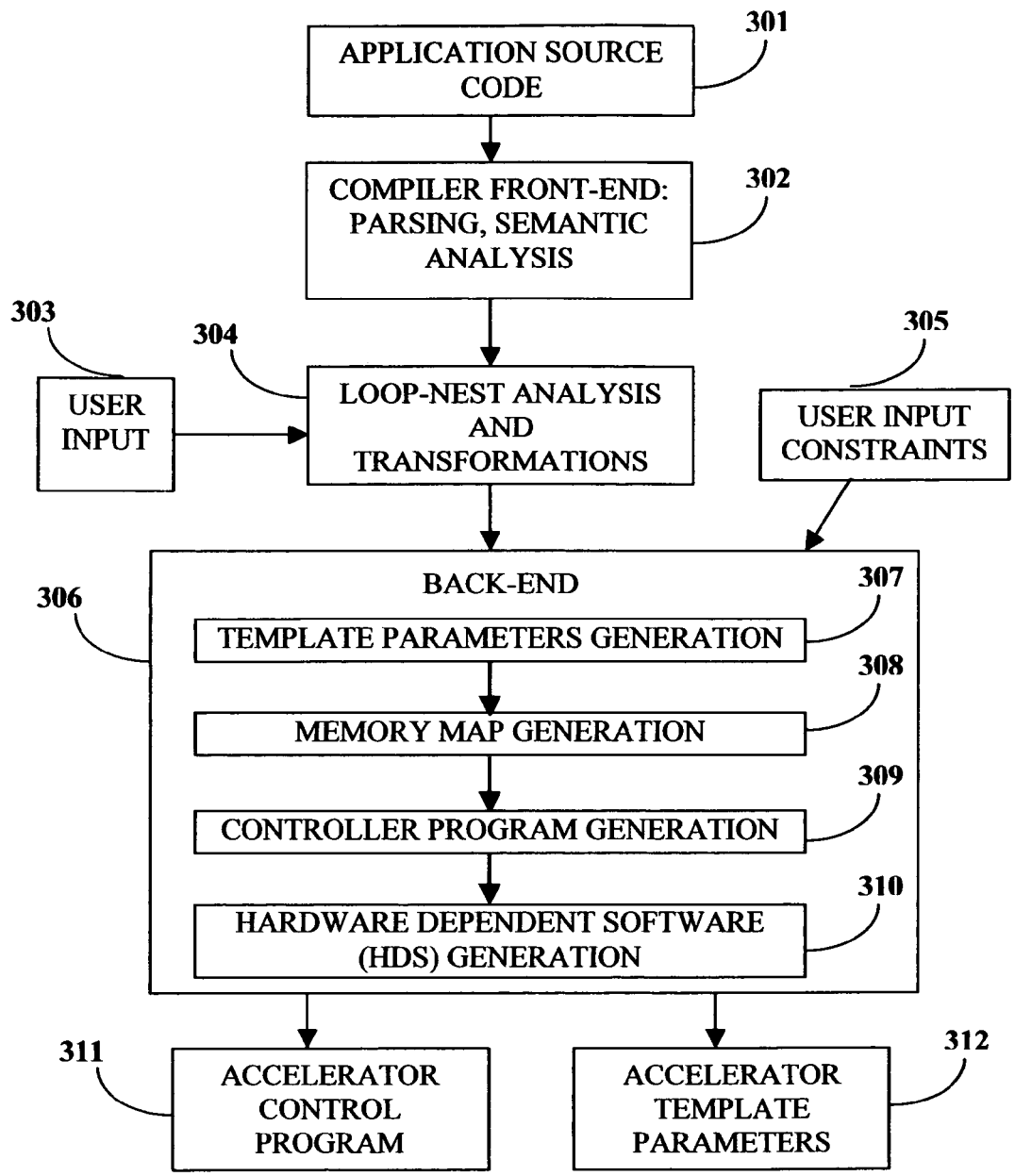
FIG. 3 illustrates the processes involved in extraction of an accelerator control program from an application source code.

FIG. 3 illustrates the various steps involved in the extraction of the accelerator component program from an application source code. The first step in partitioning is a compiler front-end that performs the task of parsing and semantically analysing 302 the input application source code, i.e., the C source code 301 to ensure validity and semantic correctness. Further, the compiler front-end converts the input application to an internal intermediate representation (IR) format. The IR serves as the repository or database of the application for all further steps in the partitioning process. The partitioning process works with any standard compiler front-end. The IR can be either in the Abstract Syntax Tree (AST) format or the list-based N-addr code format. The Stanford University Intermediate Format (SUIF) compiler front-end is used for the implementation of the partitioning process. However, the techniques mentioned in this invention can be used with any other standard IR and compiler front-end.

The second step of the extraction process is loop-nest analysis and transformations 304. Loop-nest analysis 304 involves dependence analysis and pointer analysis.

Dependence analysis is described below. In the partitioning process, dependence analysis refers to the method of determining the conflicts between the various references to arrays in the loop. A conflict arises when two or more array references access overlapping areas of either the local 103 or main memory 109.

The partitioning process 201 needs array dependency information to allow it to perform code motion of array references and also loop transformations, such as tiling and distribution that are impacted by array dependences.

Array dependences are of the following two types: loop-independent and loop-carried. A dependence, either true, anti or output, that is independent of the loop nest is termed as loop-independent, while a dependence that arises because of loop iterations is termed as loop-carried. Examples of the two dependences are shown below:

| loop: | |
|---|---|
| A[i] = A[i−1] + A[i+1]; | // Stmt1 |
| B[2*i] = A[i]; | // Stmt2 |

In the above loop, there is a loop-independent dependency between Stmt2 and Stmt1. There is also a loop-carried dependency between the array references in Stmt1, as iteration i of Stmt1 is dependent on iterations i−1 and i+1.

To determine if there are dependences between any pair of array references, the index expressions of the array references need to be analysed. Dependence analysis is performed only if the index expressions are linear equations. Array references involving non-linear index expressions are assumed to conflict with all other references. If the two index expressions are linear equations of the form:
"a*i+b" and "c*i+d", then the respective array references are in conflict if, for some i1, i2 in the loop iteration space, the equation "a*i1+b=c*i2+d" is satisfied.

The greatest common divisor (GCD) test is used to determine the conflict. However, any existing technique such as the Omega test can be used to determine the array dependency. If there is dependence between the pair of array references, a dependence vector that indicates both the direction and distance of dependence is calculated. The dependence vector encapsulates all information regarding the dependence, including whether it is loop-independent or loop-carried, the distance of the vector, i.e., the iteration that conflicts with the current iteration and the direction of the vector, i.e., counting towards the lower or the upper loop bound.

The data dependency pass can be either pre-calculated or performed "on-the-fly". A pre-calculated pass would determine the dependences between all array references and store the same in one operation. An "on-the-fly" pass, on the other hand, would perform the actual dependence test as and when any subsequent transformation requests information between a pair of references.

FIG. 4 illustrates a sample application source code on which the process of dependency analysis will be conducted. The results of this application are described below. After dependency analysis, the dependency vectors are listed below.

Dependency vector between a[i+1][j+1] and a[i][j+1]:<1, 0>
This dependency vector indicates that for the outer loop i.e., index i, the two array accesses have a distance of one iteration. Notice that because the two array accesses have a non-zero distance in the outer loop, they are independent in the inner loop, i.e., for a given outer loop index value, the two array access will never be in conflict.

Dependency vector between a[i+1][j+1] and a[i+1][j]:<0, 1>
This dependency vector indicates that the two array accesses have a distance of one iteration for the inner loop, i.e., index j. This implies that the second array access, in the current iteration of the inner loop, refers to the same location as the first array accessing the previous iteration of the inner loop. Similarly, other dependency vectors are listed below:
Between a[i][j+1] and a[i+1][j]:<−1, 1>
Between a[i][j] and a[i+1][j+1]:<−1, −1>
Between a[i][j] and a[i][j+1]: <0, −1>
Between a[i][j] and a[i+1][j]: <−1, 0>

Pointer analysis is a technique used to disambiguate two or more pointer references in the application source code. In the context of the partitioning process, pointer analysis is used to solve the problem of determining if two pointer references in a loop are in conflict. Two references are in conflict if they refer to the same memory location.

Pointers can refer to either statically allocated memory locations, i.e., stack and global variables, or to dynamically allocated memory locations, i.e., heap variables. Standard pointer analysis techniques, for example points-to analysis, are used to disambiguate pointer references.

The transformation technique 304 of the extraction process contains different processes such as loop fusion, scalar replacement, loop tiling, input or compute or output loop creation, local array renaming and merging DMA 105 transfers. The aforementioned processes are described below.

Loop fusion is a transformation that combines loops where it is functionally correct to do so. Loop fusion results in a single loop whose body includes the bodies of all the fused loops. Loop fusion is functionally correct if all the original data dependencies are maintained in the fused loop and no incorrect additional dependencies are introduced. A benefit of loop fusion is that the body of the fused loop is larger than each individual loop and therefore has more potential for high-level synthesis optimisations. Another advantage of loop fusion is that data-transfers that would have occurred between the boundaries of the original loops are avoided, thereby reducing the number of DMA 105 transfers. Loop fusion can thus have a significant impact on the performance of the accelerated system.

Two loops are candidates for fusion if the following conditions are met:
 a. The step and bounds of each loop are compile-time constants;
 b. The code in between the two loops is independent of the two loops;
 c. The loops are at the same nesting level;
 d. There are no read-after-write (RAW), write-after-read (WAR) or write-after-write dependences between scalar variables in the two loops;
 e. In the fused loop, none of the array values produced by the second loop body in the current iteration are consumed or produced by the first loop body in future iterations; and,
 f. In the fused loop, none of the array values produced by the first loop body in future iterations are consumed or produced by the second loop body in the current iteration.

The application source code example illustrated in FIG. 4 does not have any candidates for loop fusion.

FIG. 5A illustrates the sample application source code on which the process of loop fusion will be applied. The two loops illustrated in FIG. 5A are candidates for loop fusion because they satisfy all the conditions mentioned above.

FIG. 5B illustrates the resultant fused loop after the application of the loop fusion process on the sample application source code illustrated in FIG. 5A.

After conducting the process of loop fusion, the resulting loop provides better acceleration than the original individual loops together. In the original application source code, the array "b" would need to be transferred twice, and array "a" would need to be transferred three times, i.e., twice for reading in, and once for writing out. After loop fusion, array "b" will be transferred once, and array "a" will be transferred once for writing out. Thus, loop fusion substantially reduces the time spent in communication or data transfers.

Scalar replacement is a compiler transformation that replaces array references with scalar variables when array references within the loop are reused. In essence, scalar replacement reduces the number of array references within the loop by replacing some of them with scalar temporaries.

The process of scalar replacement is conducted on the loop prior to the loop tiling transformation, or after all the transformations is completed on the computation loop body.

Consider the case when scalar replacement is conducted on the loop prior to the loop tiling transformation. In this case, scalar replacement reduces the amount of global memory accesses and hence reduces the amount of DMA 105 transfers. At this stage of the partitioning process, only the innermost loops of a loop-nest can be moved to an accelerator because scalar replacement converts a perfectly nested loop-nest into a loop-nest that is not perfectly nested. The partitioning process can move a loop-nest to an accelerator provided the loop next it is perfectly nested. In a perfect loop nest, the inner loop is the sole statement within the outer loop.

Consider the case when scalar replacement is conducted on the loop after all the transformations are completed. In this case, scalar replacement is applied on the code that is part of the compute core 104 of the accelerator 101. Scalar replacement reduces the amount of accelerator local memory 103 accesses thereby improving the performance of the compute core 104 of the accelerator 101.

The merging DMA 105 transfers technique, however, mitigates to a large extent the drawback of not performing scalar replacement before the loop tiling transformation. Thus, for innermost loops, scalar replacement is applied before loop tiling; and, for loop nests, scalar replacement is applied after all the other transformations.

FIG. 6A illustrates an example of an application source code on which the process of scalar replacement will be applied. The examination of the array accesses, for the innermost loop, yields candidates for scalar replacement. Using the dependency analysis information, it can be inferred that a[i+1][j+1] and a[i+1][j] are candidates for scalar replacement.

FIG. 6B illustrates the resulting application source code after the application of the scalar replacement process on the example application source code illustrated in FIG. 6A. Scalar replacement replaces the two array accesses with scalar variables a_0, and a_1. The reuse between the accesses allows optimisation of the number of array accesses within the loop. The original application source code required four reads and one write per iteration of the inner loop. After scalar replacement, each iteration of the inner loop needs three reads and one write. Similarly the a [i][j] and a[i][j+1] read access can be scalar replaced. After such a transformation, each iteration of the inner loop would need two reads and one write as compared to the original requirements of four reads and one write. Scalar replacement would be performed if only the innermost loop was selected for acceleration.

Loop tiling is a compiler transformation that replaces a loop nest with a functionally equivalent loop nest of greater depth. An n-deep loop nest may be replaced with anywhere from (n+1) to 2n deep loop nest after tiling, depending on how many of the original loops have been tiled.

Tiling a single loop creates a loop nest of depth equal to 2. The innermost loop has an increment equal to that of the original loop, and the outer loop has an increment equal to that of the tile factor or the tile size. The tile factor is also referred to as the trip size. In the context of the partitioning process, loop tiling is used to split the original loop or loop-nest into "chunks". Tiling splits the original loop iteration space into smaller regions. This tile splitting has the effect of also splitting or chunking the array access space into smaller regions or chunks. Each of these chunks can then be transferred to the local memory 103 of the accelerators using DMA 105 transfers. By selecting the appropriate tile size, the local memory requirements and also the time spent in DMA 105 transfers are controlled. A larger value of tile size implies higher local memory 103 requirements and less time spent in DMA 105 transfers. The loop tiling transformation of the partitioning process splits the original mass of computation and communication into manageable chunks, each of which can be efficiently accelerated. Also, loop tiling facilitates other advanced acceleration techniques such as double buffering. The technique of double buffering is explained under the description of FIG. 13.

Even though the loop transformation technique used in the partitioning process is similar to loop tiling technique used in software compilers, the objective and trade-offs governing the use of loop tiling is substantially different. Typically, in software compilers, the goal is to improve data cache performance. Hence, the tile size and shape is selected so that the array accesses are performed with minimum cache misses. This implies that the tile size and shape must be selected such that each tile is composed of array elements that are spatially close together, and that there is cache 108 line reuse between successive tiles. However, in the context of the partitioning process, loop tiling is employed to strike a trade-off between DMA 105 transfer sizes and local memory 103 requirements. The primary focus in the partitioning process is on tiling the loop-iteration space and not on tiling the array access space. Preserving spatial locality between array elements within a tile is not as important as tiling the loop iteration space because the computational block uses the fast local memory 103 of the accelerator 101. It is more important to tile the loop such that it uses minimum local memory 103 and also promotes reuse of array elements between successive tiles.

FIG. 7A illustrates an example of an application source code on which the process of loop tiling will be applied. In this example, only the innermost loop is tiled. However, in a similar fashion, the outermost loop can also be tiled. For illustration purposes, we assume that the tile factor is selected as 32, and that MAX is divisible by 32 without a remainder, for example, MAX=256.

FIG. 7B illustrates the resultant example application source code after the process of loop tiling is applied on the example application source code illustrated in FIG. 7A. The innermost loop is the tiled loop. It executes a constant number (32) of times for each invocation. The tiled loop acts as a unit of communication and computation in the accelerator. As all 32 iterations of the tiled loop are executed simultaneously, the memory requirement is equal to 4*32 words for the 4 reads in addition to 1*32 words for the 1 write, assuming that each element of the array "a" is of word size. Of course, in this example, we can reuse the memory allocated to the read of a[i][j] for the write of a[i][j], and scalar replacement can be used to reduce the number of reads, resulting in an optimised memory size of 2*32 words. However, as illustrated below, optimising the memory size may result in sub-optimal performance. As a general guide, the partitioning process usually resolves memory and performance trade-offs in favour of performance provided the memory constraints are met.

The input-compute-output loop creation technique involves splitting the tile loop, i.e., the innermost loop created by loop tiling into multiple loops such that each loop can be classified as either a loop for transferring data into, i.e., input, or a loop for computing, or a loop for transferring data out of, i.e., an output of the accelerator. The number of such loops created depends on the body of the original tile loop. Typically, this transformation creates three loops, one input, one compute and one output from the original loop. The input loop encapsulates all data transfers from main memory 109 into the accelerator's local memory 103. The compute loop contains all the computation statements from the original loop body, modified to work on values stored in accelerator's local memory 103, and the output loop encapsulates all data transfers from the local memory 103 to the main memory 109.

The objective of the input-compute-output loop creation technique is to re-structure the original loop such that the communication or data transfer portions are segregated from the computation portions. Once this segregation process is accomplished, the communication portions can be converted into DMA 105 transfer statements, and the computation parts can be converted into register transfer language (RTL) datapaths using high-level synthesis. Further, during this segregation process, optimisations are employed to either improve the parallelism between DMA 105 transfers, or to optimise the DMA 105 transfers. The optimisations including local array renaming and merging DMA 105 transfers are detailed below.

Local array renaming is a process used to improve the parallelism between DMA 105 transfers. This process removes data dependences between array accesses, thereby allowing them to be transferred concurrently. Dependences, such as anti-dependences and output-dependences between local array accesses can be eliminated by renaming the local arrays involved. Renaming has the effect of allocating different memory locations to the arrays, thus removing any conflicts in the addresses.

Once the arrays accesses become independent, they can be transferred in parallel provided there is sufficient memory bandwidth, thereby speeding up the overall time spent in data-transfers between accelerator local memory 103 and main memory 109.

The input and output loops, after input-compute-output loop creation, contain statements that transfer data from global arrays into accelerator local arrays. The merging DMA 105 transfers technique reduces the amount of such transfers by merging the statements in the input or output arrays. Two input statements can be merged, or two output statements can be merged if they transfer common values and if the merged statement results in linear array index expressions. This optimisation eliminates redundant transfers, thus speeding up the overall time spent in data-transfers between the accelerator local memory 103 and main memory 109. The input-compute-output loop creation and the optimisation techniques of local array renaming and merging DMA 105 transfers are described below. Input-compute-output loop creation technique works on the output of loop tiling. The loop tiling output illustrated in FIG. 7B is used as the input in this illustration. Also, for purposes of illustration, scalar replacement transformation is not applied on the example application source code illustrated in FIG. 7B. The innermost loop, i.e., tiled loop is now distributed into three loops, one input, one compute and one output.

FIG. 8 illustrates the example application source code after the process of input-compute-output loop creation is applied on the application source code illustrated in FIG. 7B. The local prefix for the array accesses indicates that the arrays should be allocated in the local memory of the accelerator. The first innermost loop is the input loop, the second is the compute loop and the third is the output loop. Notice that the compute loop now operates only on arrays allocated to the local memory 103, i.e., with local prefixes. Thus, the compute loop is free from the main memory 109 space and has access to arrays placed in the fast, high-bandwidth memory of the accelerator.

A further benefit of this transformation is that each statement of the input loop or compute loop can be executed in parallel. This transformation is possible because these loops only transfer data from one location to another and do not modify the data. Thus, all the four statements of the input loop can be transferred in parallel through DMA 105 transfers, resulting in efficient communication between the accelerator and main memory 109. This output of input-compute-output loop creation transformation is, however, not the most efficient in memory utilization and performance. The two transformations, namely, local array renaming and merging DMA 105 transfers can be applied to further optimise the memory requirements and performance of the accelerator.

FIG. 9 illustrates the resultant application source code after the application of the local array renaming and merging DMA 105 processes on the example application source code illustrated in FIG. 8. Note that FIG. 8 illustrates the resultant example application source code after the process of input-compute-output loop creation is applied on the application source code illustrated in FIG. 7B.

In the local array renaming process, the input, compute and output loops operate on the tiled portions of the array. Each local array needs to only hold the values of the tile. Further, as only the innermost loop is tiled, the local arrays in the tiled portion of the loop can be made single dimensional. Thus, each of the multi-dimensional local array accesses can be converted into single dimensional accesses. For the example input loop, this results in the following two single dimensional local arrays: local_a__1, and local_a. This significantly reduces the memory requirements from requiring a MAX*32 words local memory to a 2*32 words local memory.

In applying local array renaming process for the example source code, the write array access "a [i][j]" is either independent of the other read accesses or has a non-positive dependency distance with them. This implies that the write access can be renamed to a different array, thus avoiding conflicts between the reads and the write. This results in a new local array "rename_local_a" which holds the values of a [i][j] that need to be written back to the main memory 109. The result of this renaming is that the read DMA 105 transfers and the write DMA 105 transfers are independent and could thus proceed in parallel. In this example, the 4 reads of the next set of array elements can proceed in parallel with the write of the current set of array elements, resulting in a further speed-up of the data communication.

FIG. 10 illustrates the resultant source code after the application of the merging DMA 105 transfer process on the application source code illustrated in FIG. 10. The statements in the input or output loops contain redundant transfers. For example, transferring 32 elements each of a[i][j] and a[i][j+1] is equivalent to transferring 33 elements of a[i][j]. The two statements can be combined to result in a reduction of 31 elements transfer. The merging DMA 105 transfer technique combines two or more statements that access the same array provided that the index expression of the combined array access remains a linear expression. The typical candidates for merging DMA 105 transfer are of the type a[c*i] and a[c*i+k] where c, k are constant values and k is less than the tile factor. Further k has to be a multiple of c. In the example illustrated in FIG. 10, the DMA 105 transfers merging process reduces the DMA 105 transfers by 62 elements. This transformation may result in multiple input or output loops.

The final process in the partitioning process is the back-end process 306. The back-end process 306 performs the following tasks:

a. Determines the various parameters of the accelerators 307. The parameters of the accelerators include the number of DMA channels, size and number of RAM memory banks, etc.

b. Determines the memory map 308. Each accelerator's address space, the address location of its various components, and the address of each accelerator local variable are determined.

c. Generates the accelerator controller program 309. The accelerator control program directs and co-ordinates the various accelerator tasks such as DMA transfers, computations, etc.

d. Generates the device drivers 310. The device driver acts as the software interface between the application and the hardware accelerator.

The back-end 306 operates on the output of the previous loop-nest analysis and transformations step 304. The back-end 306 passes utilize the structure and contents of the transformed loops to achieve the translation of the loop into a hardware accelerator.

The first task of the back-end is to construct the appropriate accelerator. The accelerator contains components such as local memory, DMA's 105 ports, etc., that can be customized to get the best possible performance and area trade-offs. The template parameters generation 307 pass analyses the transformed loop(s) to determine the accelerator parameters. The accelerator parameters include DMA channels, RAM bank sizes, compute core port and RAM bank compute core connectivity.

A DMA 105 channel is an entity that performs data-transfer between a source and a sink memory. A channel can be either a physical channel, i.e., a hardware entity that contains address generation units and registers, or a virtual channel. A virtual channel is an entity that holds the attributes of the data-transfer, for example, source and sink addresses, addressing modes, etc., separate from the physical implementation of the transfer mechanism.

The number of channels influences both the area and the performance of the accelerator. As the channels are operable in parallel, it is beneficial to have multiple channels that can transfer data in parallel, thus speeding up the overall rate of data-transfer. However, each channel incurs a hardware cost in terms of gates or memory. The step of determining the number of DMA 105 channels allows for a trade-off between the area cost of the DMA 105 component of the accelerator and its data-transfer performance. The algorithm to determine the number of DMA 105 channels is itemized below:

Step 1: Assign an order number to each of the input, compute and output loops.

Step 2: Each local array access that is in an input loop, compute loop or output loop constitutes a vertex. An edge exists between two vertices if there is a DMA 105 transfer between them. The direction of the edge is the direction of DMA 105 transfer. Create a graph G with vertices V and edges E.

Step 3: Number each vertex with its order number. The order number is the number of the input-compute-output loop from which this vertex was created.

Next, assign channels to the edges. Edges with overlap between the order numbers of their source and sink vertices represent DMA transfers that benefit from being parallel. Hence, these edges are allocated different channels.

Step 4: Group vertices according to their order number.

Step 5: Proceed through the groups of vertices according to their order number.

Step 6: For each vertex in the group, if it is a source vertex, assign different channels from the list of available channels to each of the source vertex's outgoing edges. Mark each edge as active. Remove the assigned channels from the list of available channels.

Step 7: If no channels are available, identify a candidate edge that is active and that has already been assigned a channel, and then allocate the same assigned channel to the above vertex. Note that the choice of the candidate edge can influence the overall performance of the accelerator. Choose an edge that has the shortest distance between its sink and source vertices. Remove the candidate edge from the graph.

Step 8: If the vertex is a sink vertex, mark each of its incoming edges as inactive. Move the channels assigned to its incoming edges to the list of available channels.

Step 9: Repeat steps 6, 7, 8 until there are no more groups of vertices.

The algorithm described above balances the cost of creating new channels with the performance loss of sharing the same channels. Sharing channels implies that the DMA 105 transfers cannot proceed in parallel. However, it may not be cost effective to create more channels in order to increase performance. This algorithm can be tuned to optimise the cost-performance trade-off. This optimisation is conducted by initialising the list of available channels at the start of the algorithm. The more the number of available channels, the better the performance and higher the cost as the cost is directly proportional to the number of gates or logic elements.

RAM banks, sizes: RAM banks are memories local to the accelerator. These memories are required to hold the data transferred from the main memory 109 using DMA 105 transfers, or to hold the data generated from the computations performed by the compute core 104. As each RAM bank has a limited number of ports, if is essential to have multiple banks in order to access multiple data in parallel. Access to multiple data in parallel allows the DMA 105 channels to operate in parallel, and also improves the performance of the compute core 104. The algorithm to determine the number of RAM banks and sizes is provided below:

Step 1: Create a graph G with vertices V and edges E as described in steps 1, 2, 3 of the algorithm described above used to determine the number of DMA channels.

Step 2: Assign a size to each vertex that belongs to an input or output loop. The size of the vertex is calculated by substituting the index expression of the array reference with the maximum and minimum values of the loop index variable. If the minimum or maximum values are not known, then the size of the array is assigned to the vertex. By default, vertices belonging to compute loops are assigned a size of zero.

Step 3: Proceed through the groups of vertices in order.

Step 4: For each vertex in the group, collect all instances of vertices with the same array name and combine into a single vertex. The size of the combined vertex is the maximum of the sizes of the individual vertices.

Step 5: For each source vertex in the group, assign a bank from the list of available banks. Change the size of the bank to be the maximum of the current bank size and the size of the vertex. Initially, all banks are of size zero. Remove the assigned bank from the list of available banks.

Step 6: If no banks are available, choose a candidate bank to assign to this vertex that has the closest size to the size of the vertex.

Step 7: If the vertex is a sink vertex, move all banks assigned to its source vertices to the list of available banks.

Step 8: Repeat steps 4, 5, 6, 7 until there are no more groups of vertices.

The above algorithm assigns different banks to arrays that can be DMA transferred in parallel. This assignment is performed provided memory banks are available. The list of available memory banks can be used to control the creation of more RAM banks. Typically, new RAM banks can be added to the available list provided the memory budget for the accelerator is not exceeded.

RAM banks and compute core 104: After the number of RAM banks required has been calculated, and the assignment of local arrays to the RAM banks has been completed, the next step is to determine the number of RAM bank ports, the number of compute core ports and the connectivity between the RAM banks and compute core 104.

The number of ports for each RAM bank depends on several factors. The first factor is the technology in which the RAM bank is implemented which may limit the maximum number of ports per RAM bank. FPGA solutions typically allow each RAM bank to have a maximum of two ports, i.e., dual read-write ports. The second factor is the data requirement of the accelerator components. For example, if a RAM bank needs to service the DMA 105 and the compute core 104 at the same time, then a dual port is necessary. The third factor is the area cost of the ports. Adding ports to a RAM bank typically increases the area cost in an exponential manner. Thus, limitations on the accelerator area may prohibit RAM banks with many ports. Similarly, the number of ports for the compute core 104 is determined by the data requirements of the parallel operations. As adding ports increases the area cost, accelerator area limitations also influence the number of compute core ports.

The compute core 104 accesses data stored in the RAM bank memories through the connections between the compute core ports and RAM bank ports. These connections, either bus-based or point-to-point, determine the connectivity between the compute core 104 and the RAM bank. Similar to the ports, the connectivity also influences the area cost of the accelerator and the performance of the compute core 104.

The algorithm to determine the number of ports for compute core 104 and their connectivity with RAM bank ports is described below. This algorithm is based on the assumption that RAM bank assignment has been performed. In the RAM bank assignment process, the location of each local array in the accelerator is determined. The algorithm provided below assigns compute core ports and connects them to the previously determined RAM bank ports.

Step 1: Proceed through each compute loop.

Step 2: For each statement in the compute loop, mark all compute core ports and connections as available.

Step 3: Assign different compute core ports to the array accesses in the statements of the compute loop. The assignment process is as follows:
 a. If there are no available compute core ports, create a new port and connection. Mark the port and connection as unavailable.
 b. If no compute core ports are available, connections are created and a candidate port is assigned to the array access.
 c. If the array has already been assigned a compute core port, the same port is re-used for this array access. Mark the port and connection as unavailable.
 d. If there are multiple available ports, choose a port that has an existing connection to the RAM bank that contains the array. Mark the port and connection as unavailable.
 e. If no such port is available, create a new connection between a candidate port and one port of the RAM bank that contains the array. Mark the port and connection as unavailable.

Step 5: Repeat steps 3 and 4 until there are no more statements in the compute loop.

Step 6: Repeat steps 2, 3, 4 until there are no more compute loops.

This algorithm assumes that all the operations within a compute loop statement can occur in parallel. Thus, the algorithm may assign more or fewer ports than is necessary. In order to avoid this problem, the input to the algorithm can be changed to represent the exact parallelism that would be detected by a C to RTL synthesis tool for the given compute loop.

The accelerator parameters as determined by the steps mentioned above for the example application source code are illustrated in FIG. 11. In this example, assume that the target implementation is a FPGA with a limit of dual ports for each RAM bank. Further, assume that DMA 105 and compute core 104 components of the accelerator operate in parallel. For determining the number of compute core 104 ports, assume that the schedule for the compute core 104 code is the same as that after input-compute-output loop creation.

Memory map generation: Once the parameters of the accelerator components have been determined, the next step is to generate the memory map 308 of the accelerator. The memory map lists the addresses, both local and global of each component of the accelerator and all the local array and scalar variables. Assigning addresses allows the processor to communicate with the accelerator by using load and store instructions.

Each accelerator needs to be allocated a base address and a high address. All the address values between the base and the high address belong exclusively to the accelerator. Typically, the base address of the accelerator is specified by the system designer, or by the tools used to build the entire system consisting of the processor(s), accelerator(s) and other peripherals. The high address depends on the total memory requirements of the accelerator and is calculated during memory map generation 308. In the memory-mapped scheme, each register and memory location in the accelerator must be assigned an address if the processor 107 needs to access it. Hence, the total address space consumed by the accelerator typically depends on the number of registers and the size of the memories in its components.

The memory map also specifies the address of each accelerator local array and scalar variable that needs to be accessed by the processor 107, DMA 105 or compute core 104. The local arrays reside in the RAM banks and need to be assigned a start or base addresses. The DMA 105 transfers can then occur to array index offsets from the base address. Similarly, the compute core 104 can access the local arrays by specifying the offset from the base address.

The local scalar variables need to be assigned unique addresses. This allows the processor 107 to access them in order to either initialize or read their values. Further, the processor 107 may need to access some of the accelerator control unit's 106 registers in order to perform actions such as starting or halting the accelerator, debugging and diagnostics, etc. All such registers must also be assigned unique addresses.

Two types of address spaces exist for the accelerator based system: the global address space, and local address space. All memories or registers that reside in the accelerator but need to be accessed by the processor 107 must be assigned addresses in the global address space. This implies that all local arrays, scalars and accelerator control unit's 106 registers that are accessed by the processor 107 must be assigned addresses in the global address space.

The local address space is intended for the accelerator's usage and may not be completely visible to the processor 107. Local arrays, scalars and accelerator control unit's 106 registers accessed by the accelerator components such as DMA 105 and compute core 104, must be assigned in the local address space. Note that most local array or scalar variables and accelerator control unit's 106 registers may reside in both the global and local address space. However, some may reside only in the local address space. For example, local arrays or scalar variables that are used for temporary purposes during DMA 105 transfers or computations are present in the local address space and do not have a corresponding address in the global address space. Global address space is usually limited by system constraints, while the accelerator has virtually unlimited local address space at its disposal. However, in order to minimize the area cost of the internal address lines, the local address space is usually limited to a reasonable storage, for example 16 mega bytes of address space.

Memory map of the accelerator components: The first step in generating the memory map 308 is determining the starting address for each component of the accelerator. The accelerator components include the DMA, RAM banks, accelerator control unit 106 and the compute core 104. Some of these components have a fixed size, while the size of other components is determined by the requirements of the application. For example, the size of each RAM bank is determined by the RAM bank size calculation algorithm mentioned above.

The components of the accelerator and their attributes are the inputs to the partitioning process. The attributes of the components of the accelerator include component identification, size, priority, fixed or floating, and group identification.

Priority refers to the importance of each component in the address allocation order. Components with a higher priority are allocated first. If two components have the same priority, then the component with the larger size will be allocated first.

A component is tagged as floating if it can be placed anywhere in the address map, even in the gap between components that are already mapped to addresses, provided space permits. Otherwise, the component is tagged as fixed.

If the component is part of a group, then it is tagged with a group identification. A group is considered as one component of cumulative size during address allocation.

Output: Start (i.e., base) address for each component. This address is specified as an offset from the start (i.e., base) address of the accelerator. The algorithm to generate the memory map is described below.

Step 1: Promote the size of each component.
Increase the size of each component such that it is a power of two. This step is conducted in order to simplify the address decoding in the accelerator.

Step 2: Arrange components in order of decreasing order of priority.
Components within a group are also ordered in decreasing order of priority.

Step 3: Assign an address to each component as shown in steps 6, 7, 8

Step 4: If the component is a group, first assign offsets from the group start for its components as shown in steps 5, 6 and 7. Finally, assign the start offset for the group by considering it as a component. The size of the group is the total address space required by the group after each of its components has been assigned offsets.

Step 5: If a component is fixed, the possible start offset is the first un-allocated offset.

Step 6: If a component is floating, search for the smallest unused address space between previously allocated components such that the size of the unused address space is greater than the promoted size of the component.

If such an address space exists, the possible start offset is the start address of the unused address space; if an address space does not exist, the possible start offset is the first un-allocated offset.

Step 7: Align the component on a boundary that is the same as its promoted size. If the component's possible start offset is not aligned, move the start offset to the first aligned offset. For example, if the possible start offset is 512 and the size of the component is 1024, the actual start offset becomes 1024, leaving a gap of 512 locations. This alignment is done to simplify address decoding within the accelerator.

Step 8: The actual start address of each component is then calculated.

The start address in the local address space is the sum of the actual start offset and group start offset. The start address in global address space is the sum of the actual start offset, group start offset and accelerator start address.

Address assignment for local array and scalar variables: During the step of determining RAM bank number and sizes, the assignment of local arrays to the RAM banks is also conducted. All scalar variables reside within the compute core 104. As the previous step of generating the memory map for accelerator components generates the start address for each RAM bank and the compute core 104, it becomes easy to conduct the address assignment for each local array and scalar variables. The start address of a local array is the start address of the bank for which the array is assigned. If there are multiple arrays assigned to a bank, the offset within the bank is determined by adding the size of previously assigned local arrays. The offset within the bank added to the start address of the bank then becomes the start address of the local array. Each scalar variable can be assigned an address within the compute core's 104 address space by sequentially assigning addresses starting from the base address of the compute core 104. One method of optimising the address assignment is by ordering the scalar variables according to their data-types and then performing the assignment.

Controller program generation: The controller program 309 is a set of commands that control the overall execution of the accelerator. These commands are used to initiate the various activities such as DMA 105 transfers, etc., or to synchronize between activities, for example, wait for a DMA 105 transfer to complete, or to synchronize between the processor 107 and the accelerator such as signal termination of acceleration to the processor 107.

The task of the partitioning process is to generate a custom controller program 309 for each selected loop in the application source. After the n analysis and transformation pass, the loop is transformed into a form that can be converted into the controller program.

The steps involved in generating the controller program for the transformed loop is as follows:

Step 1: Generate sequential control program: During this step the basic commands needed to execute the loop in the accelerator are determined. These commands may also contain parameters that need to be determined. For example, a "do_dma" command may also need the size of transfer, and whether it is a read or write DMA transfer. The rules listed below convert the transformed loop into the controller program.

Rule 1: Process each inner loop, whether input, compute or output

Rule 2: Generate the controller program in the same sequence as the inner loops of the transformed loop.

Rule 3: Each statement of an input loop becomes a DMA command that reads from the main memory 109 into a RAM bank.

Rule 4: Each statement of an output loop becomes a DMA command that writes from a RAM bank into the main memory.

Rule 5: Each compute loop becomes a command to initiate the compute core.

Rule 6: Insert a wait statement after each DMA or compute core command.

Rule 7: The outer-loop becomes a loop statement of the controller program that encloses all the DMA and compute core statements.

Rule 8: If the outer-nest is present, it becomes a loop statement enclosing all other statements.

The following section illustrates the application of the above rules to the example application source code, after the application source code has been transformed by input-compute-output loop creation process. FIG. 12 illustrates the application of the sequential control program generation rules on the application source code illustrated in FIG. 8. First, the controller program is applied to the situation when the outer-nest loop has not been selected for hardware acceleration. The description of the steps illustrated in FIG. 12 is provided below. The "LOOP"-"END_LOOP" statements enclose the body that will be executed "num_iterations" number of times. These statements are derived from the outer loop generated by input-compute-output loop creation. The "DO_DMA" commands are derived from the statements in the input/output loops. The size of the DMA 105 transfer is equal to the number of iterations of the corresponding input/output loop. The address_mode parameter indicates the type of addressing scheme to be followed during the transfer. The "off-set" mode indicates that the addressing scheme is increment based. The "DO_DMA" commands are assigned the channel numbers determined during the template generation pass. The source and destination addresses of the "DO_DMA" commands are addresses of the global/local arrays. The addresses of the global arrays are typically not known until run-time. Therefore, these addresses are shown as symbolic addresses. They are resolved during run-time, and the driver code then patches the controller program with the exact values before executing it. The "DO_DMA" commands only initiate, i.e., launch the DMA transfers and do not wait for completion of the DMA transfer. Once the DMA transfer has been launched, the DMA component operates autonomously and performs all the actions needed for the transfer.

The "DO_COMPUTE" command initiates the computational block associated with the compute loop. Each compute loop is assigned a thread identification (thread id) number and a mode identification (mode id) number. Compute cores 104 that can execute in parallel are assigned different thread ids. Compute cores 104 that do not execute in parallel are assigned different mode ids. A set of compute loops that execute in parallel will have different thread ids and usually the same mode id, while a set of compute loops that execute exclusively will have different mode ids and usually the same thread id. Thread and mode ids can be assigned in any manner. It is suggested that they be assigned sequentially, starting from thread id=0 and mode id=0. The "DO_COMPUTE" commands only initiate, i.e., launch a compute core 104 and do not wait for completion of the computation.

The "WAIT_DMA" and "WAIT_COMPUTE" statements are synchronization statements. A "WAIT" statement stalls the accelerator controller program until the wait condition is satisfied. A "WAIT_DMA" condition is satisfied when the channel it is waiting on becomes idle. A "WAIT_COMPUTE" condition is satisfied when the data-path compute core 104 corresponding to thread id and mode id becomes idle. A "WAIT" statement does not stall the entire accelerator.

The "WAIT" statement prevents the accelerator from launching further commands until the "WAIT_COMPUTE" condition is satisfied. All previously launched commands continue their execution. This prevents the accelerator from deadlocking and also allows for multiple conditions to be checked in parallel.

The "SINT" statement issues an interrupt signal to the processor 107. This statement can be used to send interrupt-based messages to the processor 107. Typically, "SINT" statement can be used to signal execution status such as end, or error.

The "END" statement indicates the end of the controller program. The accelerator reaches the idle state upon executing this statement. For safe and predictable execution, it is the responsibility of the controller program to ensure that all the other components such as the DMA and compute cores 104 are in an idle state before the "END" statement is executed.

FIG. 13 illustrates the application of the controller program generation rules for the situation when the outer-nest loop has also been selected for hardware acceleration.

Parallelise DMAs 105 and compute cores 104: The previous step of generating a sequential controller program is focused on converting the loop into its equivalent accelerator control form. As a result, the sequential controller program is functionally correct but not necessarily optimal. The parallelise DMAs 105 and compute cores 104 step further improve the performance of the accelerator by enabling various components of the accelerator to operate in parallel and can significantly enhance the overall performance of the accelerator.

The sequential controller program can be optimised by two methods. In the first method, DMA 105 transfers are parallelised such that reads and writes to main memory 109 occur in parallel. In the second method, DMA 105 transfers are parallelised with the compute core 104 operation such that all the DMA 105 transfers and the compute core 104 operate in parallel. To parallelise the DMA transfers, a technique called wait propagation is employed; and, to parallelise the DMA transfers with the compute core 104, a technique called double buffering is employed. The wait propagation and double buffering techniques are explained below.

Wait propagation: The goal of the wait propagation process is to permit parallel DMA transfers by moving the "WAIT_DMA" statements. The key observations for wait propagation are as follows:

1. "DO_DMA" statements are launch commands. The controller can execute the next statement immediately after a "DO_DMA" has been issued. Thus, two successive "DO_DMA" statements will result in two DMA transfers occurring in parallel.
2. "WAIT_DMA" statements are termination statements. The controller will not issue further commands until the current "WAIT_DMA" condition is met.
3. All launch commands without intervening "WAIT" statements will execute in parallel.

"WAIT_DMA" statements are placed as far away as possible from the originating "DO_DMA" commands. Wait propagation attempts to achieve this by moving each "WAIT_DMA" statement to the last place that is valid for execution. Wait Propagation moves "WAIT_DMA" statements beyond other "DO_DMA" commands and thus parallelizes the DMA transfers. A "WAIT_DMA" statement can be propagated until it reaches a statement that is in conflict with it. A statement is in conflict with a "WAIT_DMA" statement if:

a. it uses the same channel as the "WAIT_DMA" condition,
    b. it's activity reads/writes an address that is read/written by the "DO_DMA" activity corresponding to the "WAIT_DMA" statement.
    c. it is the "END" statement or the "SINT" statement.

Step 1: Mark all "WAIT" statements as not propagated.
Step 2: Proceed through all the "WAIT" statements sequentially.
Step 3: If the "WAIT" statement is not in conflict with the statement immediately following it, propagate the "WAIT" statement as described in Step 4.
Step 4: Move the "WAIT" statement as the next statement after its immediate successor. If its immediate successor has multiple outflow paths, then place a copy of the "WAIT" statement along all the paths.
Step 5: If the "WAIT" statement is in conflict with the statement immediately following it, then mark the "WAIT" statement as propagated.
Step 6: Repeat steps 3, 4 and 5, above, until the "WAIT" statement is marked as propagated.
Step 7: Repeat steps 2, 3, 4, 5 and 6, above, until all the "WAIT" statements have been marked as propagated.

By propagating the "WAIT_DMA" statement as far away as possible from its source "DO_DMA" statement, the algorithm optimises the control program. This is because other statements between the "DO_DMA" and "WAIT_DMA" statements can be executed while the DMA transfer occurs. Thus, this parallelisation speeds up the overall execution of the control program.

Wait propagation occurs along all the control paths. Moving a "WAIT_DMA" statement beyond a statement with multiple paths leading out will result in a placement of the "WAIT_DMA" along each of the paths. This is necessary to ensure correctness and improve parallelisation. Thus, propagating a "WAIT_DMA" statement beyond an "END_LOOP" statement moves the "WAIT_DMA" statement to both the beginning of the corresponding loop and to the next place after the "END_LOOP" statement. This allows parallelisation of write DMA transfers with read DMA transfers.

FIG. 14 illustrates the control program derived after applying the wait propagation process to the sequential control program generated from the previous step. In order to simplify the description, wait propagation is performed on the sequential control program generated where the outer-nest loop is not selected.

Hence, as a result of wait propagation, the three "DO_DMA" statements can potentially execute in parallel provided memory and bus bandwidths are available. This parallel execution results in substantial improvement of the overall accelerator performance as compared to a sequential control program.

Double buffering: The goal of double buffering is to permit DMA 105 transfers to proceed in parallel with the core computation. In the sequential control program, a "DO_COMPUTE" statement is invoked only after all its dependent DMA 105 statements have completed execution. This implies that, usually, the DMA 105 components are idle during the execution of the actual computations of the accelerator. This results in sub-optimal overall performance of the accelerator if the DMA 105 and the compute statements were to occur within a loop that is executed multiple times. A simple way to perform DMAs 105 in parallel with computes is to fetch the next set of data into a different location in the local memory 103 while the compute core 104 is operating on the current set of data.

Provided there are no data dependences that prevent it, such an ordering of DMAs 105 and computes may increase the overall performance by up to two times over the sequential control program.

In the double-buffered approach, each local array has two alternate locations that are also known in the art as buffers. While a DMA fills up one array buffer, the compute core 104 operates on the previously filled other buffer. The DMA 105 and the compute core 104 exchange buffers. This exchange of buffers occurs only after both the DMA 105 and the compute core 104 finish their current operation.

The DMA 105 always fetches the next set of data, while the compute core 104 operates on the current set of data. It can be seen that such a mode of operation effectively hides the latency of the faster operation within the latency of the slower operation, i.e., the overall latency will be only the latency of the slower operation and not the sum of the latencies.

The following operations can occur in parallel provided data dependences permit: read DMA 105 of the next set of data, computation on the current set of data, and write DMA 105 of the previously computed set of data. This technique is called double buffering because the result of this transformation is that each local array whether read or written has two buffers into which it is alternately read or written.

The partitioning process employs a form of software pipelining to achieve the double buffering technique. It first builds the data dependency graph of the sequential control program and then employs a window-based software pipelining technique to parallelise the DMAs and the computes. Any standard software pipeline techniques such as Modulo Scheduling, or Perfect Pipelining can be used. Note that the double buffering is performed only on loops within the control program because double buffering is beneficial only when the same DMA 105 and compute statements are executed multiple times.

FIGS. 15*a* and 15*b* illustrate the control program derived after performing double buffering. Double buffering is applied on the example control program shown as output after wait propagation.

After applying the double buffering technique, the performance gains can be substantial, up to a maximum of approximately two times, when compared to the original code. The actual performance gain obtained depends on the relative latencies of the DMAs and the compute operations.

The "SWITCH_BUFFER" command switches the local memory buffer of the local array, alternating between the two buffers. This switch occurs for all "DO_DMA" and "DO_COMPUTE" statements associated with that local array. The "SWITCH_BUFFER" command can be implemented either by the local memory unit 103 or by the compute core unit 104. In the case of implementation by the local memory unit 103, the local memory unit 103 must maintain separate buffer pointers for the DMAs 105 and the compute core 104. In the second case, the compute core 104 and the DMAs 105 explicitly operate on the two buffers by using two base addresses for the same local array and co-ordinate using flags to switch between the buffers.

Hardware dependent software (HdS) generation 310: The final step in the partitioning process is to generate the software layer that provides interfaces to allow the application software to interact with the accelerator. In the software art, such a software layer is referred to as hardware dependent software (HdS). The partitioning process generates the HdS that consists of device driver code and modifies the application to include calls to the HdS layer. The device driver code is a set of C language functions that abstract the low level details of interacting with the accelerator and allow the application software to interact with the generated accelerator. Typically, the application software needs functions to invoke, terminate, and query the accelerator.

After generation of the driver code, the partitioning process then modifies the application to invoke the accelerator with appropriate settings instead of the selected software loop or function.

Generate device driver layer for software-hardware interaction: This step generates software code in the form of a device driver that can be used to control the accelerator. The application invokes the device driver with the appropriate arguments for each loop or function that is to be executed on the accelerator hardware. This step has two main goals. One goal is to generate all the necessary software code that allows the processor 107 to interact with the accelerator. The second goal is to generate software code that ensures that the data in the main memory 109 is coherent with the data in the processor's cache 108. This coherence is necessary because the accelerator can change the main memory 109 contents directly through the use of DMA 105 transfers, potentially invalidating data held in the processor cache 108. The structure of the device driver layer is shown in FIG. 17.

Figure 17:
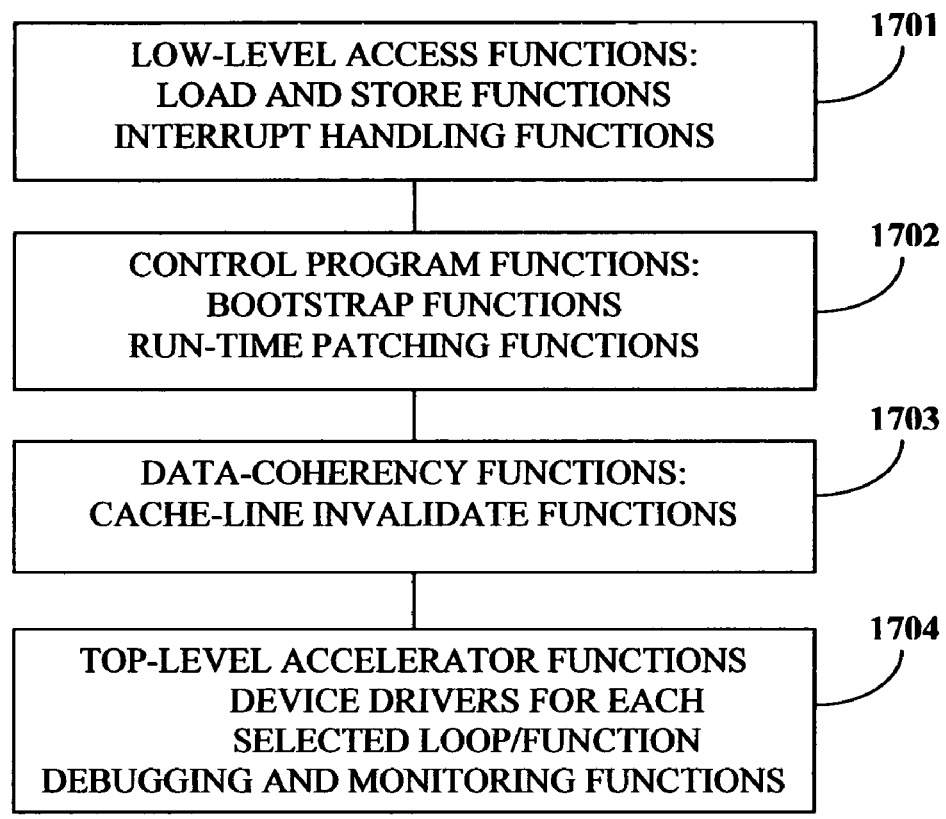
FIG. 17 illustrates the architecture of device driver layer for software-hardware interaction.

FIG. 17 illustrates the device driver layer for software-hardware interaction. Low-level access functions: The low-level access functions 1701 serve as the communication primitives that are used by the other upper-level functions to perform tasks on the accelerator. The primary method of communication between the processor 107 and the accelerator is by the storage of values to the memory-mapped storage locations, such as registers or local memory 103 of the accelerator by using store instructions. The accelerator can communicate with the processor 107 in one of two ways. In the first case, the accelerator is a passive device and the processor 107 periodically monitors the storage locations of the accelerator for any change in value. The value of the accelerator's storage locations can be accessed using load instructions. In the second case, the accelerator can raise an interrupt to the processor 107 in order to signal its intent to communicate with the processor 107. The processor 107 accesses the storage locations within the accelerator by using load instructions. The low-level function that the processor 107 executes on receiving an interrupt is called the interrupt handler.

The partitioning process emits the necessary load or store functions and the interrupt handling functions. The load or store functions depend on the data-types, such as fixed-point, floating-point, etc., that appears in the application source code. The load or store functions also depend on the width of the system-bus. FIG. 16 illustrates the list of store and load functions for the various supported data-types assuming a system bus width of 32 bits.

The interrupt handling functions depend on the type of the processor 107 and also the operating system (OS) running on the processor 107. Interrupt handling functions for all the supported processor 107 and OS combinations are pre-coded and are used in the partitioning process. Similarly, all the load or store functions are pre-coded.

Control program functions 1702: The accelerator is programmable and can execute different control programs. For example, one accelerator can be programmed to execute any or some of the selected loops or functions in the application. This is achieved by downloading the appropriate control program to the accelerator. Bootstrap functions and run-time patching functions are the two main types of control program functions.

Bootstrap functions: The control program must be loaded into the accelerator in order to execute the selected loop or function. One option is to synthesize the accelerator with all the required control programs already stored in its memory. Another option is to build the application with the required control programs stored as data in the form of arrays within the application. When the application is subsequently executed, the required control program can be downloaded onto the accelerator. This downloading can happen either once at the start of application execution, or, as and when the selected loops or functions are to be executed in the accelerator. In order to have efficient downloads, the control program is itself transferred by using the DMA 105 capabilities of the accelerator. A bootstrap control program is present or can be stored at run-time in the accelerator. This program can be configured to fetch the required control program from the main memory 109 and store it in the accelerator local memory using DMA 105 transfer. The device driver layer provides the required bootstrap functions to store and configure the bootstrap function in the accelerator.

Run-time patching functions: The device driver layer also provides functions to patch the control program with values that are determined only at application run-time. Typical examples of such values include the starting addresses of the arrays that are to be transferred by DMA, the number of iterations of the loops, etc.

Data-coherency functions 1703: The presence of data cache 108 in the processor 107 may lead to inconsistency of data between the processor's cache 108 and the main memory 109. This inconsistency could impact the correctness of the application's execution in one of two ways. First, the processor's cache 108 may hold data that is more recent than the data at the same address in main memory 109. In such a situation, the accelerator's DMA unit 105 may fetch stale data from main memory 109. Second, once the accelerator's DMA unit 105 writes data into the main memory 109, the data in the processor's cache 108 may become stale. In this situation, the processor 107 may then start operating on the stale data. In order to overcome these situations, the device driver layer contains functions that can either flush the required cache 108 lines into the main memory 109, or can invalidate the required cache 108 lines. Flushing the cache 108 line ensures that the main memory 109 is updated with cache 108 data. This is useful in situations when the cache 108 data is more recent than the main memory 109 data. Invalidating the cache 108 line forces the processor 107 to fetch the data from main memory 109. This is useful in situations where the main memory 109 data is more recent than cache 108 data. The functions to flush or invalidate cache 108 lines are processor 107 specific. This is because each processor 107 typically has its own conventions and rules regarding cache 108 line flushing or invalidation.

The device driver layer implements the cache 108 line flush or invalidate functions for each processor 107 supported. The partitioning process also generates functions that flush or invalidate only the required cache 108 lines. The partitioning process analyses the selected loop or function and then generates functions that only flush or invalidate those cache 108 lines that may be affected by the DMA 105 statements in the control program. These functions, referred in the art as data-coherency functions are called by the top-level accelerator functions to ensure coherency of data between the cache 108 and main memory 109.

Top-level accelerator functions 1704: The top-level accelerator functions are functions that are invoked from within the application. These top-level functions invoke the other lower-level device driver layer functions. The top-level functions consist of the device drivers for each selected loop or function and functions useful for monitoring and debugging the accelerator.

Device drivers for selected loops or functions: The device driver performs the tasks of initialising the accelerator with the scalar values, patching the control program with run-time values, starting the accelerator, monitoring the accelerator completion either in polling mode or in interrupt mode, and finally, loading the scalar values from the accelerator into the processor's 107 registers.

Debugging and monitoring functions: Debugging and monitoring functions are provided to allow for easy debugging and monitoring of the accelerator. While the accelerator is correct-by-construction, bugs or errors may arise when the accelerator is integrated into the system. These functions allow for application-level debugging of the accelerator. These functions include functions for printing the local memory contents, starting, stopping and single stepping through the control program.

The partitioning process automatically modifies the application source code to invoke the device drivers. The selected loops or functions are replaced with calls to the device driver.

We claim:

1. A compilation method for extracting and implementing an accelerator control program from an application source code in a processor based system consisting of an accelerator, one or more processors and one or more main memories, wherein the accelerator comprise direct memory accesses, compute cores, local memories and a programmable accelerator controller unit and the application source code comprises arrays and loops, said compilation method comprising the steps of:

performing loop nest analysis, wherein said loop nest analysis consists of dependence analysis and pointer analysis and wherein dependence analysis determines the conflicts between the various references to arrays in the loop and pointer analysis determines if two pointer references in a loop are in conflict;

performing transformations to convert the loops from their original sequential execution semantics to parallel execution semantics, wherein said step of performing transformations further comprises the steps of:

conducting loop tiling, wherein loop tiling is a compiler transformation that divides the iterations of the loop nest into tiles and the size of the tile is selected based on the amount of local memory available and on the required performance of the accelerator; and conducting input compute output loop creation, wherein the inner-most loop created by the loop tiling process is split into multiple loops and classifying each of the split loops into an inner input, compute or output activity of the accelerator;

performing back-end processes for creating an accelerator control program that parallelizes the activities of the components of the accelerator, using the output of the loop-nest analysis and transformation, further comprising the steps of:

determining the parameters of the accelerator including the number of direct memory access channels, size and number of random access memory banks and the connectivity between the ports of the random access memory banks and the compute core;

determining the memory map containing said accelerator's address space, the address location of the accelerator's components, and the address of the accelerator local variable;

generating the accelerator control program comprising a sequential control program;

wherein generating the sequential control program comprises the steps of:

processing each inner input, compute or output loop;
generating the controller program in the same sequence as the inner loops of the transformed loop;
converting each statement of an input loop into a direct memory access command that reads from main memory into a random access memory bank;
converting each statement of an output loop into a direct memory access command that writes from a random access memory bank into global memory;
converting each compute loop into a command to initiate the compute core;
inserting a wait statement after each DMA or compute core command;
converting the outer loop into a loop statement of the accelerator controller program that encloses all the direct memory access and compute core statements; and,
converting a outer nest, if present, into a loop statement enclosing all other statements,
generating hardware dependent software, wherein the hardware dependent software is a software layer that provides interfaces to allow the application software to interact with the accelerator hardware; and,
modifying the application source code in order to invoke the hardware dependent software for executing the accelerator control program.

2. The method of claim 1, wherein the step of performing transformations further comprises the step of conducting loop fusion, wherein loop fusion is a transformation that combines loops where it is functionally correct to do so, thereby enabling higher level synthesis optimizations and reducing the number of direct memory access transfers.

3. The method of claim 1, wherein the step of performing transformations further comprises the step of conducting scalar replacement, wherein scalar replacement is a compiler transformation that replaces array references with scalar variables when array references within the loop are reused, thereby reducing the amount of main memory accesses and reducing the amount of direct memory access transfers.

4. The method of claim 1, wherein the step of performing transformations further comprises the step of conducting local array renaming for making array accesses independent thereby improving the parallelism between direct memory access transfers.

5. The method of claim 1, wherein the step of performing transformations further comprises the step of merging direct memory access transfers to reduce the amount of direct memory access transfers by merging the statements in the input or output loops created from the input compute output loop creation process.

6. The method of claim 1, wherein the step of dependence analysis further comprises the steps of:
determining loop independent array dependences, wherein a loop independent dependence is a dependence that is either true, anti or output, and that is independent of the loop nest;
determining loop carried dependences, wherein a dependence is loop carried if the dependence arises out of the loop iterations;
analyzing index expressions to determine dependences between array references; and, determining a dependence vector that indicates the direction and distance of the dependence and whether the dependence is loop independent or loop carried.

7. The method of claim 6, wherein, the dependence between array references is pre-calculated and stored for further use.

8. The method of claim 1, wherein the step of pointer analysis disambiguates two or more pointer references in an application and determines if two pointer references refer to the same memory location and are therefore in conflict.

9. The method of claim 1, wherein the pointers refer to statically allocated memory allocations.

10. The method of claim 1, wherein the pointers refer to dynamically allocated memory allocations.

11. The method of claim 3 wherein the step of scalar replacement is performed on the loop prior to the loop tiling transformation.

12. The method of claim 3 wherein the step of scalar replacement is performed on the computational loop body after all the transformations are completed.

13. The method of claim 3, wherein the step of scalar replacement is performed before the step of loop tiling transformation for inner most loops and the step of scalar replacement is performed after all other transformations for loop nests.

14. The method of claim 1, wherein loop tiling is performed on the loop nest.

15. The method of claim 1, wherein the compute loop contains all the computation statements from the original loop body, modified to work on values stored in the accelerator's local memory.

16. The method of claim 1, wherein the compute loop encapsulates all data transfers from the local memory to the main memory.

17. The method of claim 1, wherein the memory map specifies the address of each accelerator local array and scalar variable that needs to be accessed by the processor, direct memory access or compute core.

18. The method of claim 1, wherein the step of determining random access memory bank number and sizes further comprises the assignment of local arrays to the random access memory bank.

19. The method of claim 1, wherein the accelerator control program initiates and synchronizes direct memory access transfers, or synchronizes the activities between the processor and the accelerator.

20. The method of claim 1, wherein the accelerator control program is generated for each loop of the application source and the step of generating the accelerator control program further comprises the steps of:
parallelizing direct memory accesses and compute cores, further comprising the steps of:
parallelizing the direct memory access transfers such that reads and writes to main memory occur in parallel; and
parallelizing the direct memory accesses transfers with the compute core operation such that all the direct memory accesses transfers and compute core operate in parallel.

21. The method of claim 20, wherein the step of parallelizing the direct memory access transfers with the compute core operation, further comprise the step of double buffering, wherein each local array is provided with two alternative buffers and when a direct memory access fills up one buffer, the compute core operates the other buffer.

22. The method of claim 1, wherein the hardware dependent software consists of device driver code which is a set of C language functions that abstracts the low level details of interacting with the accelerator and enables the application software to invoke, terminate or query the accelerator.

23. The method of claim 1, wherein the hardware dependent software further consists of data coherency functions for resolving the issue of data coherency between the processor's cache and the main memory.

* * * * *